Oct. 3, 1944. T. O. DAVIDSON 2,359,303
DRAGLINE EXCAVATOR
Filed Nov. 6, 1943

Trevor O. Davidson,
INVENTOR.
BY Hoar & Ruhloff
ATTORNEYS

Patented Oct. 3, 1944

2,359,303

UNITED STATES PATENT OFFICE 2,359,303

DRAGLINE EXCAVATOR

Trevor O. Davidson, Milwaukee, Wis., assignor to Bucyrus Erie Company, South Milwaukee, Wis., a corporation of Delaware Application November 6, 1943, Serial No. 509,222

4 Claims. (Cl. 37—135)

My invention relates to new and useful improvements in dragline excavators.

The conventional drag-bucket, for use on what is known as a dragline excavator, is a boxlike structure open at the top and the front end. On the bottom, set back somewhat from the front, is a digging lip, carrying a row of digging teeth. A hoist chain, forking and attached to a trunnion on each side behind the center of gravity, supports the bucket. A drag chain, forking and attached to a clevis on each side of the front, drags the bucket through the earth which is being excavated.

An arch spans the open top of the bucket near the front thereof.

Shortly above its point of forking, the hoist chain carries a forwardly projecting sheave. A chain running from the top of the arch, back and over this sheave, and thence to the point of fork of the drag chain, serves during hoisting to hold the bucket level, and thus prevent dumping, so long as this chain is held taut by tension on the drag chain.

It is believed that this conventional construction is familiar to the art, but for further details thereof, reference is now made to U. S. Patent No. 1,974,426, to W. Lehman, dated September 25, 1934.

It is the principal object of my invention to provide an improved system of chains for the control of the drag-bucket of a dragline excavator. Throughout the specification and claims, whenever I refer to a "chain," I intend a chain, rope, or other equivalent flexible tension member.

In addition to my principal object, above stated, I have worked out a number of novel and useful details, which will be readily evident as the description progresses.

My invention consists in the novel parts and in the combination and arrangement thereof, which are defined in the appended claims, and of which one embodiment is exemplified in the accompanying drawing, which are hereinafter particularly described and explained.

Figure 1:
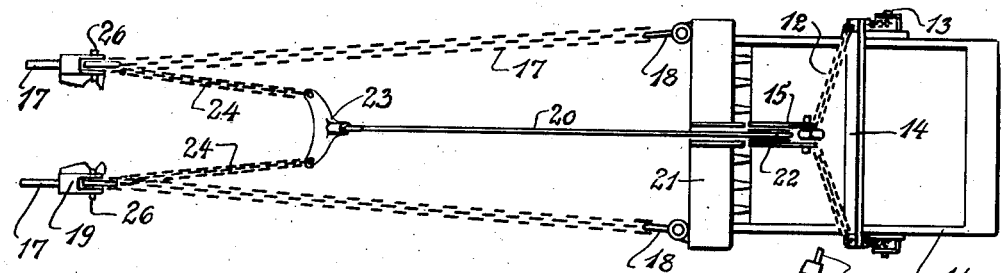
Figure 1 is a plan view of a dragline bucket and associated chains, embodying my invention, in holding position.
Figure 2:
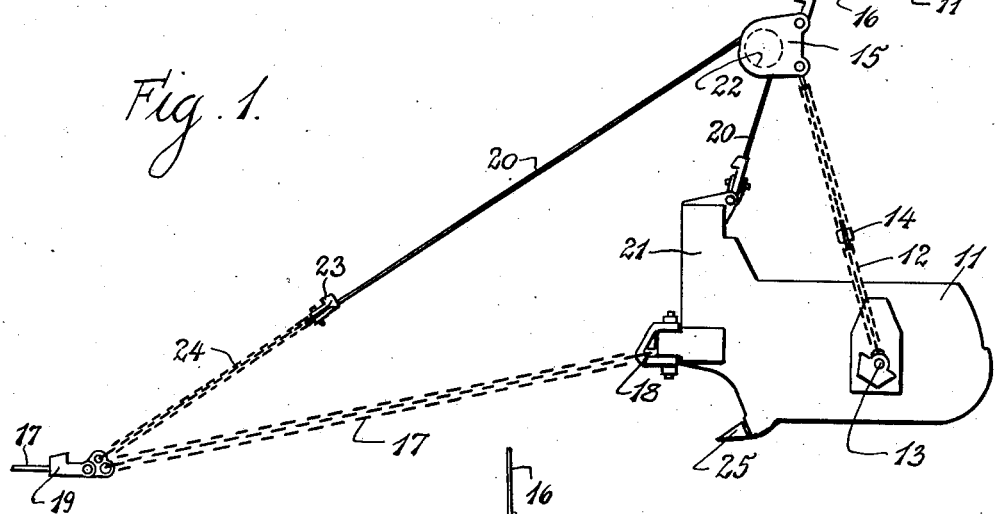
Figure 2 is a side elevation of the same, in holding position.
Figure 3:
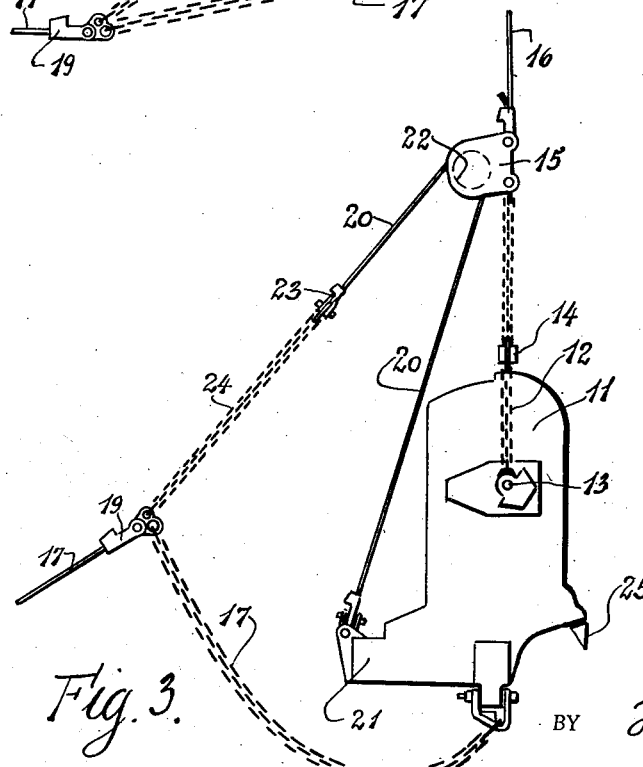
Figure 3 is a side elevation of the same, in dumping position.

Referring to the figures, we see that 11 is a dragline bucket, of well-known conventional design.

Each branch 12 of the fork of the hoist chain is attached to a trunnion 13 on one side of the bucket, behind the center of gravity thereof. The two branches are held apart by a spreader 14, so as not to chafe on the sides of the bucket. Above the spreader 14, the two branches converge to a sheave-housing 15, from which extends a single hoist chain 16. This single chain proceeds in well-known manner over a sheave (not shown) on a boom (not shown) to a winch drum (not shown) on the main frame (not shown) of the excavator.

Each drag chain 17 is attached to the front edge of one side of the bucket, by means of a hinged clevis 18, preferably of the form shown in U. S. Patent No. 2,131,063, to George W. Mork.

In each drag chain 17, a distance forward from the bucket, there is a multiple rope-socket 19, the purpose of which will be explained later herein.

The stabilizer chain 20 is attached to the center of the arch 21 of the bucket. Thence it extends around a sheave 22 in the sheave housing 15 to a spreader 23, where it diverges into two branches 24, each of which is attached to one of the multiple rope-sockets 19 in the drag chain 17. Each of these drag chains proceeds in well-known manner, usually via a fairlead (not shown) to a winch drum (not shown) on the main frame (not shown) of the excavator.

The bucket is operated, by means of drag chains, hoist chain, and stabilizer chain, in the well-known conventional manner. But the twinning of my drag chains enables me either to steady the digging operations of my bucket, if the two drums rotate in unison; or to control the presentation of the digging edge 25 of my bucket, by operating one of the drums in advance of the other. An example of the steadying effect of the double drag chain is when one corner of the digging edge becomes hooked into the work more firmly than the other; without the twinning, the hooked corner would tend to disengage, instead of continuing digging.

A few words as to the spreader 23. This is advisable, instead of a more constricted fork joint, so as to minimize the tendency of the two rope-sockets 19 to clap together, when tension on chains 17 is relieved, with tension still remaining in chains 24. The spread of spreader 23 should be roughly about half the spread between chains 17, so as to have as great as possible an offsetting effect, without interference with chains 17 at other times.

It is also desirable to have sockets 19 extend inwardly beyond the ends of pins 26, so as to protect those pins against damage and wear.

Having now described and illustrated one form of my invention, I wish it to be understood that my invention is not to be limited to the specific form or arrangement of parts herein described and shown, or specifically covered by my claims.

I claim:

1. In a dragline excavator, in connection with the conventional arched drag-bucket, the combination of: a forked hoist chain, one branch of the fork thereof being attached to one side of the bucket behind the center of gravity thereof, and the other branch being similarly attached to the other side; two laterally spaced drag chains, one being attached to the forward portion of one side of the bucket, above and forward of the digging edge thereof, and the other drag chain being similarly attached to the other side; a sheave, carried by the hoist chain above the fork thereof; and a forked stabilizer chain, extending from the center of the arch of the bucket, around the sheave, thence forwardly, then forking, one branch of the fork being secured to one of the two drag chains, and the other branch being attached to the other drag chain.

2. In a dragline excavator, in connection with the conventional arched drag-bucket, the combination of: a forked hoist chain, one branch of the fork thereof being attached to one side of the bucket behind the center of gravity thereof, and the other branch being similarly attached to the other side; two laterally spaced drag chains, one being attached to the forward portion of one side of the bucket, and the other drag chain being similarly attached to the other side; a sheave, carried by the hoist chain; and a forked stabilizer chain, extending from the center of the arch of the bucket, around the sheave, thence forwardly, then forking, one branch of the fork being secured to one of the two drag chains, and the other branch being attached to the other drag chain.

3. A dragline excavator, according to claim 2, further characterized by having a spreader of substantial width at the fork in the stabilizer chain.

4. A dragline excavator, according to claim 2, further characterized by having, at each point of securing a branch of the stabilizer chain to one of the drag chains, an attaching element, the inner side of which is reinforced against wearing contact with the other such element.

TREVOR O. DAVIDSON.